B. L. SMITH.
Grinding Mill.
No. 202,063.  Patented April 2, 1878.
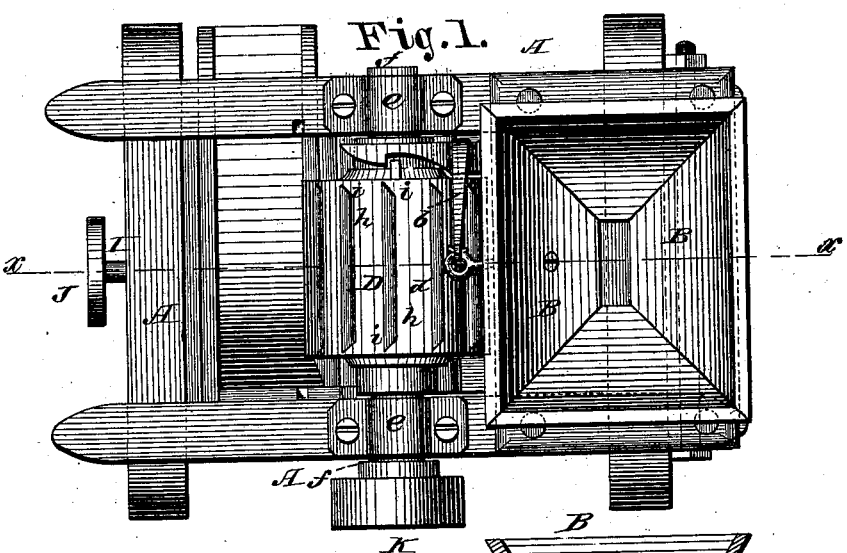
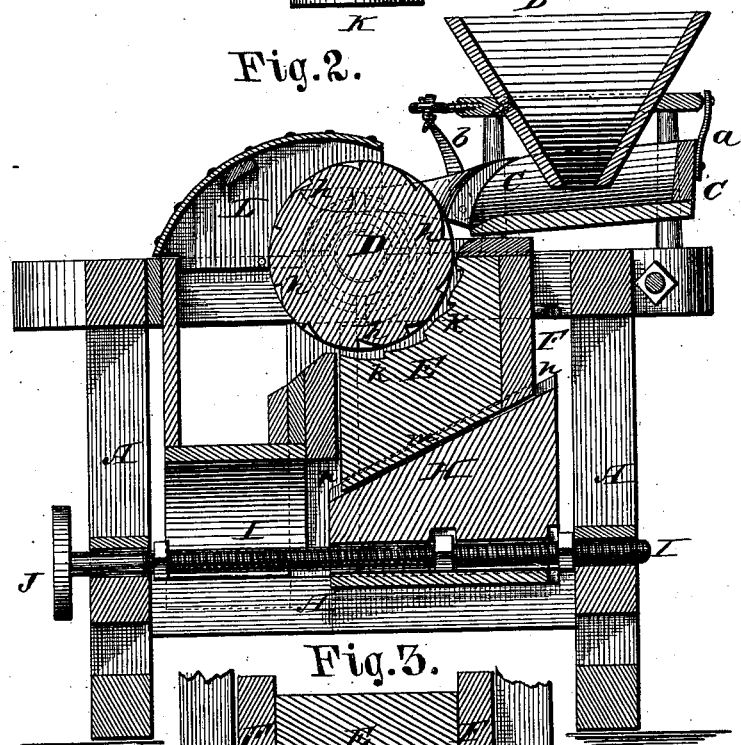
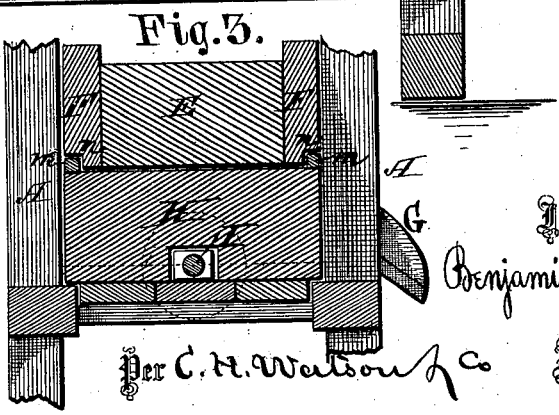
Witnesses:
P. C. Dietrich
Frank H. Duffy
Inventor:
Benjamin L. Smith
Per C. H. Watson & Co.
Attorneys.

UNITED STATES PATENT OFFICE.

BENJAMIN L. SMITH, OF GADSDEN, ALABAMA.

IMPROVEMENT IN GRINDING-MILLS.

Specification forming part of Letters Patent No. 202,063, dated April 2, 1878; application filed February 1, 1878.

*To all whom it may concern:*

Be it known that I, BENJ. L. SMITH, of Gadsden, in the county of Etowah and State of Alabama, have invented certain new and useful Improvements in Grinding-Mills; and I do hereby declare that the following is a full, clear, and exact description thereof, which will enable others skilled in the art to which they appertain to make and use the same, reference being had to the accompanying drawings, and to the letters of reference marked thereon, which form a part of this specification.

The nature of this invention consists in the construction and arrangement of a grinding-mill, as will be hereinafter more fully set forth.

In the annexed drawings, to which reference is made, and which fully illustrate this invention, Figure 1 is a plan view. Fig. 2 is a central vertical section on line $x\ x$, Fig. 1, and Fig. 3 is a detail view of my invention.

A represents the frame-work of the grinding-mill, provided at one end with an elevated hopper, B. Under this hopper is suspended a chute, C, which is so arranged as to be adjusted at a greater or less angle, to feed the material faster or slower to the grinding mechanism. The chute C is, at the outer end, suspended by two straps, $a\ a$, and at the inner end a single strap, $b$, connects it with a thumb-screw, $d$. By turning this thumb-screw the strap $b$ may be lengthened or shortened, as desired, and thus adjust said chute.

From the chute C the material to be ground passes in between a rotating cylinder, D, and a concave, E, and passes out on the other side into an inclined conductor, G, as shown.

The cylinder D is secured upon a shaft, $f$, having its bearings in boxes $e\ e$ on the frame A. In the surface of the cylinder D is made a series of longitudinal grooves, $h\ h$, forming angles $i\ i$ at their ends. The concave $e$ is also provided with a series of grooves, $k\ k$, and is secured in a frame or box, F, which is inclined forward on the bottom, and provided on the bottom, at each side, with an offset, $n$, extending across the entire bottom.

The box F is placed upon an inclined bed, H, which has ribs or ways $n\ n$ at the sides, to fit against the offsets $m\ m$ in the under surface of the box, and thus prevent any lateral motion thereof. The inclined bed H rests upon suitable ways in the main frame A and is moved backward and forward by means of a screw-shaft, I, having a hand-wheel, J, on one end.

It will thus be seen that the concave can be adjusted up and down with relation to the cylinder by simply turning the screw-shaft in either direction, for as said shaft is turned in one direction the bed H is moved inward, and its inclined upper surface causes the box F, with the concave, to move upward; and in reverse manner the concave descends by reversing the screw-shaft. By this means the concave is carried steadily and bodily upward and forward, and is adjusted to give an exact horizontal fit to the action of the grinding-cylinder.

By removing the hopper B the concave can be easily taken out behind without disturbing the cylinder.

The cylinder D is rotated by a belt around a pulley, K, secured on the cylinder-shaft $f$, or by any other suitable means.

L is a cap or casing over the cylinder.

Having thus fully described this invention, what is claimed as new, and desired to be secured by Letters Patent, is—

The concave E, provided with a series of grooves, $k\ k$, and secured in box F, inclined forward on the bottom, and provided with offset $n$, in combination with the inclined bed H, having ways $m$, the single screw-rod I, and the rotating cylinder D, substantially as and for the purpose set forth.

In testimony that I claim the foregoing as my own I have hereto affixed my signature in presence of two witnesses.

BENJAMIN L. SMITH.

Witnesses:
THOMAS B. SMITH,
SAMUEL B. HUGHES.